(12) United States Patent
Su et al.

(10) Patent No.: US 6,317,813 B1
(45) Date of Patent: Nov. 13, 2001

(54) METHOD FOR ARBITRATING MULTIPLE MEMORY ACCESS REQUESTS IN A UNIFIED MEMORY ARCHITECTURE VIA A NON UNIFIED MEMORY CONTROLLER

(75) Inventors: Jen-Pin Su; Chun-Chieh Wu; Wen-Hsiang Lin; Tsan-hui Chen, all of HsinChu (TW)

(73) Assignee: Silicon Integrated Systems Corp. (TW)

( * ) Notice: Subject to any disclaimer, the term of this patent is extended or adjusted under 35 U.S.C. 154(b) by 0 days.

(21) Appl. No.: 09/314,245

(22) Filed: May 18, 1999

(51) Int. Cl.⁷ ........................................... G06F 12/00
(52) U.S. Cl. ........................... 711/158; 711/151; 711/168
(58) Field of Search .................... 711/158, 151, 711/168; 345/530–535

(56) References Cited

U.S. PATENT DOCUMENTS 5,524,235 * 6/1996 Larson et al. ..................... 395/478
5,805,905 * 9/1998 Biswas et al. ..................... 395/732

* cited by examiner

Primary Examiner—Matthew Kim
Assistant Examiner—Pierre M. Vital
(74) Attorney, Agent, or Firm—Coudert Brothers (57) ABSTRACT

In a memory controller system, a method for granting a system memory by a memory request arbitrator to a request among a plurality of pending memory access requests is provided. The plurality of the memory access requests includes Rfrsh_Hreq, Crt_Hreq, Group AB, Crt_Lreq and Rfrsh_Lreq and are respectively asserted by a host control circuitry and/or a graphical control circuitry which are implemented and integrated on a single monolithic semiconductor chip. The host control circuitry and the graphical control circuitry shares the system memory and the memory request arbitrator includes a refresh queue and the graphics control circuitry includes a CRT FIFO. The method prioritizes the plurality of the memory access requests in order of Rfrsh_Hreq>Crt_Hreq>Group AB>Crt_Lreq>Rfrsh_Lreq. The Rfsh_Hreq is memory refresh request signal of first type whenever the refresh queue being full, the Crt_Hreq is memory access signal of a first type for fueling the CRT FIFO with display data, the Group AB are memory access request signals of a second type output either from the graphical control circuitry or the host control circuitry, the Crt_Lreq is memory access signal of a third type for fueling the CRT FIFO with display data, the Rfrsh_Lreq is memory refresh request signal of second type whenever the refresh queue being non-empty.

24 Claims, 6 Drawing Sheets

METHOD FOR ARBITRATING MULTIPLE MEMORY ACCESS REQUESTS IN A UNIFIED MEMORY ARCHITECTURE VIA A NON UNIFIED MEMORY CONTROLLER

FIELD OF INVENTION

The present invention relates to a method for prioritizing a plurality of memory request by a memory controller.

BACKGROUND OF THE INVENTION

In the followings, the non-unified memory architecture (Non-UMA) controller is defined as one including two separate DRAM controllers, for instance one core logic memory controller and one display memory controller, to interface the system controller and the graphical accelerator respectively. Unified Memory Architecture (UMA) is defined as one in which the graphical memory is physically allocated in the system memory. For example, an SDRAM is used as the system memory and, yet, the top memory of any row of the SDRAM can be allocated to serve as the graphical memory under Unified Memory Architecture. Furthermore, under the UMA, the graphical texture data can be dynamically allocated in the non-graphical memory area of the SDRAM. And, under the UMA, no other separate local graphical memory is physically allocated for the graphical accelerator.

Figure 1:
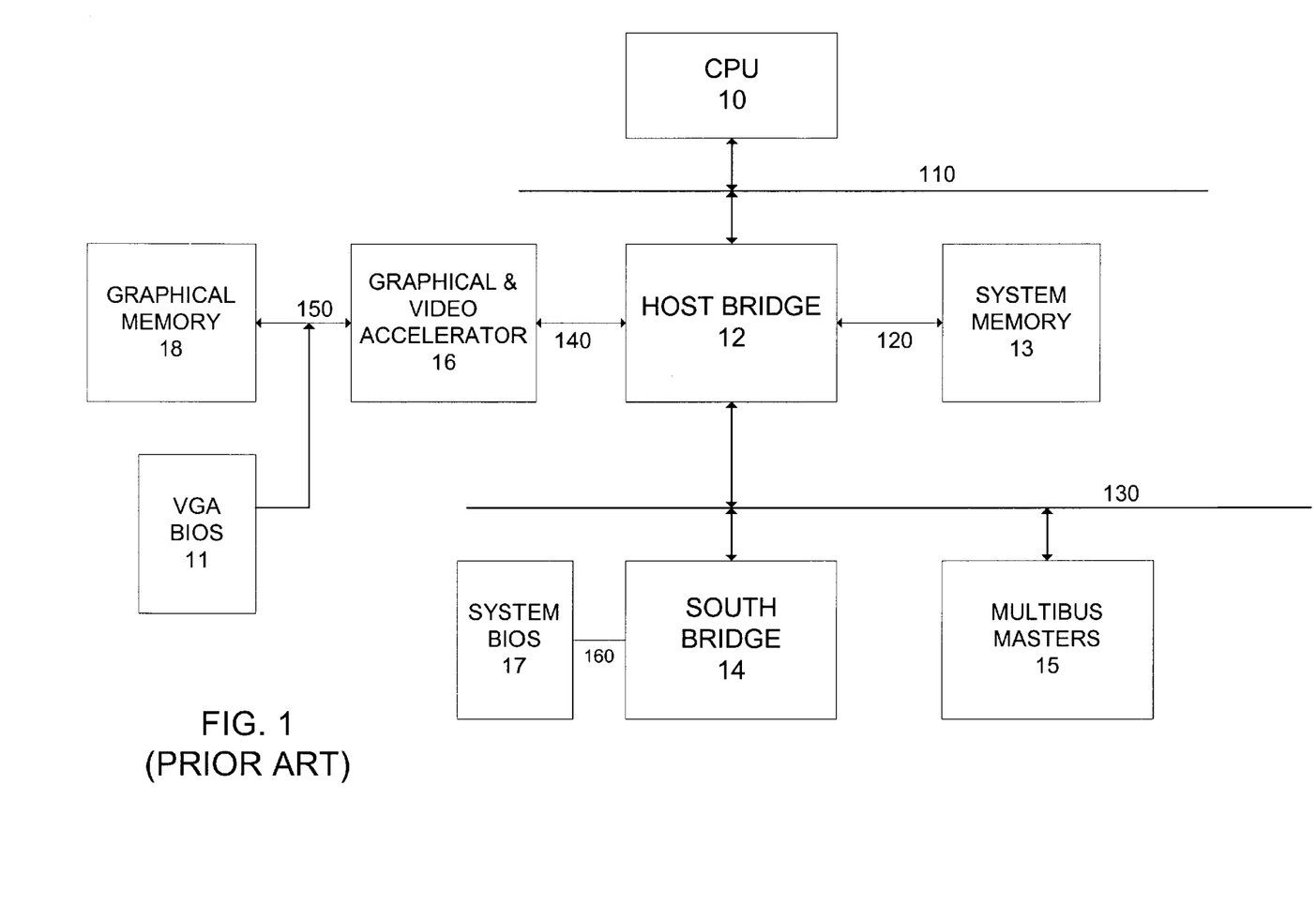
FIG. 1 shows a traditional Non-UMA based PC system.

FIG. 1 illustrates the traditional or a Non-UMA based personal computer system which typically separates the graphical memory 18 from the system memory 13. Each memory is interfaced through the memory controllers (not shown) respectively in the graphical accelerator 16 and the host bridge 12. The graphical accelerator 16 and the host bridge 12 may interface to each other via the Advanced Graphic Port (AGP) bus 140 or Peripheral Component Interconnect (PCI) bus or any other proprietary bus that could deliver high throughput in the application. The host bridge 12 situated among the host bus 110, AGP bus 140, the DRAM bus 120 and PCI bus 130 provides paths and buffering to efficiently perform data flow originated from one bus to another bus.

Possible data flow is enumerated in the following. CPU 10 accesses system memory 13 through the host bus 110, the host bridge 12, and the system memory bus 120. CPU 10 accesses the PCI devices 15 through the host bus 110, the host bridge 12, and the PCI bus 130. PCI bus master among the PCI devices 15 accesses the system memory 13 through the PCI bus 130, the host bridge 12, and the system memory bus 120. CPU 10 accesses the graphical memory 18 through the host bus 110, the host bridge 12, the AGP bus 140, the graphical accelerator 16, and the graphical memory bus 150. CPU 10 accesses the buffers (not shown) in the graphical accelerator 16 through the host bus 110, the host bridge 12, and the AGP bus 140. The graphical accelerator 16 accesses the graphical memory 18 through the graphical memory bus 150 to retrieve the frame buffer data and/or the local texture data for performing graphical operation in the graphical accelerator 16 or for conducting refresh operation of the screen data. As well known in the arts, texture data are data of a display which are associated with the three dimensional (3D) display effect. The graphical accelerator 16 may also access the system memory 13 through the AGP bus 140 to retrieve the texture data stored in the system memory 13. PCI bus master 15 may also write video data to the graphical accelerator 16 through the PCI bus 130, the host bridge 12, and the AGP bus 140.

Depending on how much functionality the graphical accelerator 16 can support, the possible data types flowing on the AGP bus 140 are classified in the followings.

CPU 10 reads or writes frame buffer data in the graphical memory 18 via the AGP bus 140. Typically, a read ahead cache and a post write buffer are provided in the graphical accelerator 16 to efficiently utilize the AGP bus bandwidth.

CPU 10 writes graphical commands, known as 2D or 3D graphic commands, into the graphical accelerator 16. Typically, a command queue (not shown) is allocated to store the commands such that the AGP bus 140 can be released as long as the command can be posted into the command queue. Besides, the command queue can be extended into the graphical memory 18. In this way, the depth of the command queue is virtually infinite with a result that command can always be posted into the command queue in zero-wait state. Each posting command will be retrieved to process when it turns out to be the next processing entry.

Processing commands typically involves retrieving the graphical data in the graphical memory 18 such that the graphical data can be computed or transformed by the graphical engine (not shown) in the graphical accelerator 16. The computed data are then written back to the graphical memory 18 for display later on.

As well known in the arts, 3D rendering operation involves the texture, the brightness, the depth, color, hue and tint of the surfaces of the objects in a graphics. Generally, 3D rendering has a voracious appetite for memory bandwidth and continues to put upward pressure on performance of the graphical memory 18. AGP bus 140 links the graphical accelerator 16 with the host bridge 12 such that some of the 3D rendering structures, i.e. the texture data, may be effectively shifted into the system memory 13, relieving the pressure of higher cost of the local graphical memory 18. Typically, the texture data are the first structure targeted for shifting to system memory 13. When implemented, reading of texture data from the system memory 13 is normally operated through the AGP bus 140.

The PCI master 15 writes the video data into the graphical memory 18. This path allows a PCI video capture subsystem to transfer data into the graphical memory 18 through a CPU write buffer (not shown) in the graphical accelerator 16.

Usually a CRT First-In-First-Out (FIFO) memory is provided in the graphical accelerator 16. The CRT FIFO would generate a request signal to periodically retrieve the display data from the display memory 18 and store the display data into the CRT FIFO such that screen data can be updated periodically to keep display continuous. To ensure the display motion is continuous, this request signal is normally treated as the second highest priority request in the graphical memory 18. The DRAM refresh request is normally generated every 15.6 $\mu$s (microsecond) to enforce a refresh cycle required by the DRAM to maintain data integrity of the memory subsystem. DRAM refresh request is placed as the highest priority generally.

Figure 2:
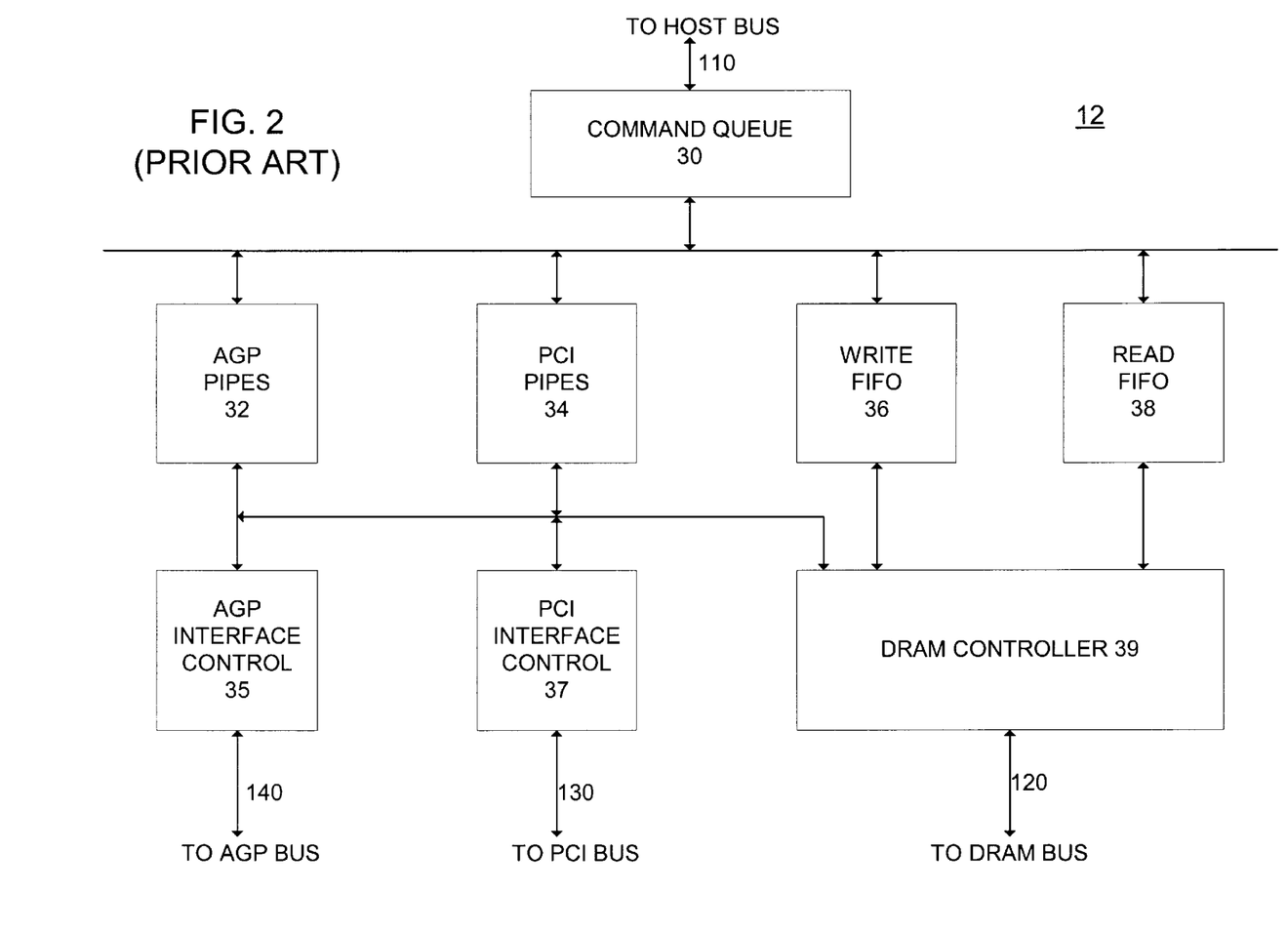
FIG. 2 shows a typical system controller in the present PC system.

A typical system controller within the host bridge 12 is set forth in FIG. 2. A command queue 30 is employed to serve a highly pipelined host bus 110. The host bus 110 may be interfaced with any kind of processor or multi processors, like Pentium, Pentium II, Power 600, and so forth. The AGP pipe 32, the PCI pipe 34, the Write FIFO 36 or the Read FIFO 38 are employed to buffer the data in the originated bus before the data are consumed in the destination bus. As well known in the arts, within the AGP pipes 32, the AGP commands are executed in a pipelined manner. Also, within the PCI pipe 34, the PCI commands are executed in a pipelined manner.

The control circuitry (not shown) associated with the command queue 30 interprets and dispatches the command to the target destination. For instance, a memory write command is digested by posting the write data into the Write FIFO 36 while a memory read command gives rise to a read DRAM cycle. The read data are stored in the Read FIFO 38 before they are forwarded to the host bus 110. Any PCI master 15 attempts to access the AGP device 16 or the system memory 13 is translated into a host cycle, and then consumed by the command queue 30.

Statistically, today's high performance graphical engine demands a voracious appetite of the memory bandwidth. Furthermore, a high bandwidth memory subsystem is required for the UMA which needs to serve the access requests from the host processor (CPU), or the bus masters (PCI) in addition to serving the access requests from the graphical engine. It can be readily achieved by some of today's advanced memory technology. For instance, the memory bandwidth can reach 800MB by building up an 8-byte wide system memory bus running at 100Mz with today's mature PC100 SDRAM technology. However, even the system is equipped with a wide bandwidth memory system in UMA, an intelligent arbitration scheme is required to efficiently utilize the memory bandwidth such that the following goals summarized in priority order are fulfilled.
(1) To ensure data integrity in the memory subsystem.
(2) To keep the display quality continuous, and thus smooth.
(3) To meet shorter latency requirement of some bus masters, like USB compliant or IEEE 1394 compliant devices. The latency is the duration between the time at which a request is issued and the time of granting of memory bus to the request.
(4) To attain higher graphical performance.
(5) To minimize the impact to the host bus performance.

SUMMARY OF INVENTION

To meet the need mentioned above, the present invention provides a method for arbitrating multiple memory access requests in a unified memory architecture via a non unified memory architecture controller.

In the non-UMA controller system, a method for granting a system memory by a memory request arbitrator to a request among a plurality of pending memory access requests is provided. The plurality of the memory access requests includes Rfrsh__Hreq, Crt__Hreq, Group AB, Crt__Lreq and Rfrsh__Lreq and are respectively asserted by a host control circuitry and/or a graphics control circuitry which are implemented and integrated on a single monolithic semiconductor chip. The host control circuitry and the graphics control circuitry shares the system memory, and the memory request arbitrator includes a refresh queue and the graphics control circuitry includes a CRT FIFO. The method prioritizes the plurality of the memory access requests in order of Rfrsh__Hreq>Crt__Hreq>Group AB>Crt__Lreq>Rfrsh__Lreq. The Rfrsh__Hreq is a memory refresh request signal of a first type whenever the refresh queue being full, the Crt__Hreq is a memory access signal of a first type for fueling the CRT FIFO with display data, the Group AB are memory access request signals of a second type output either from the graphical control circuitry or the host control circuitry, the Crt__Lreq is a memory access signal of a third type for fueling the CRT FIFO with display data, the Rfrsh__Lreq is a memory refresh request signal of a second type whenever the refresh queue being non-empty.

DETAILED DESCRIPTIONS OF PREFERRED EMBODIMENT

Figure 3:
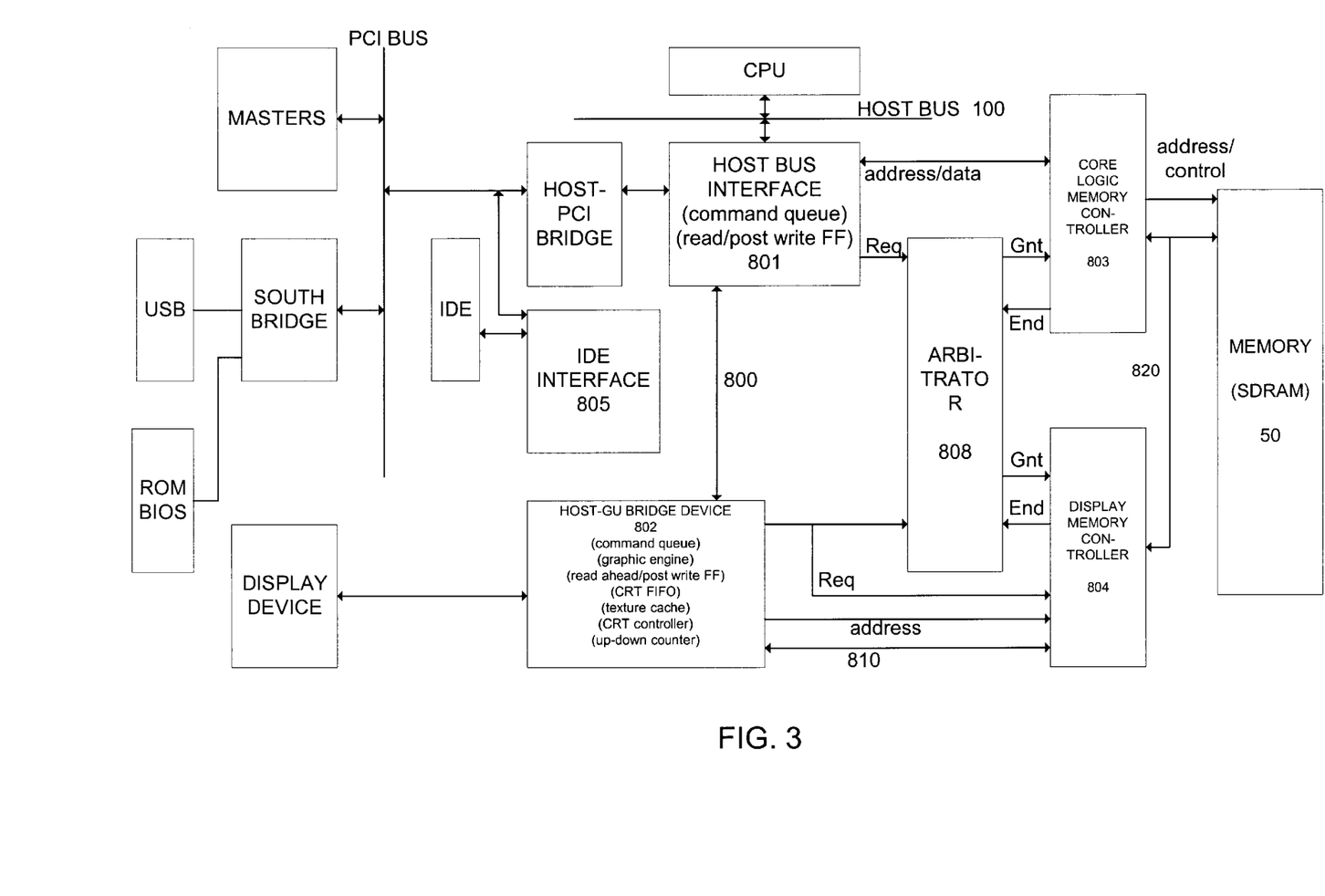
FIG. 3 shows a preferred embodiment of integrating the graphical accelerator into the system controller to support the UMA.

FIG. 3 shows the preferred embodiment of the invention which integrates a graphical accelerator with a system controller via the Non-UMA controller to support the UMA functionality. As recited above, Non-UMA controller is defined as one including two separate DRAM controllers. For instance, the core logic memory controller 803 and the display memory controller 804 are provided in FIG. 3 which function to interface the system controller 801 and the graphical controller 802 respectively with the system memory 50. In a preferred embodiment, the system memory 50 may be an SDRAM. In addition to other functionality, the system controller 801 includes a host bus interface, a command queue, a read FIFO and a write FIFO. As recited above, the UMA is defined as one in which the graphical memory is physically allocated in the system memory 50. For example, a part of the SDRAM 50 in FIG. 3 is used as the system memory purpose. Yet, top location of any row can be allocated to serve as the graphical memory under UMA. The graphical texture data can be dynamically allocated in the non-graphical memory area of the SDRAM 50. No other separate local graphical memory is physically allocated for the graphical controller 802. In FIG. 3, instead of using AGP bus shown in FIG. 1, a HOST-To-GU bus 800 is provided by the invention, which is dedicated for transferring the I/O cycles, the 2D/3D graphical commands, and the frame buffer data to/from the host bus 110. In this specification, GU is the abbreviation of Graphic-Unit and represents operations with respect to the graphics and video. The GU cycle is defined as the cycle which associates to the graphics and video operation. Since a local texture cache is provided optionally in the graphical controller 802, the required transfer rate for the texture data is lower. The texture data together with other data types, like CRT refresh data, the computed graphical data, and so forth are transferred through the GU-DRAM bus 810 which is a memory bus between the graphical controller 802 and the display memory controller 804. The system memory bus 820 is provided to transfer the graphical data, like the CRT refresh data, and the computed graphical data. An arbitrator 808 is provided to resolve the higher complexity of arbitration conditions in this invention. And the present invention sets forth a method for supporting such arbitrator 808.

To reach the goal of the invention, the present invention sets forth an arbitration scheme as detailedly described hereinafter.

A method is provided by the invention for granting a system memory by the memory request arbitrator 808 to a request among a plurality of pending memory access requests. The plurality of the memory access requests include Rfrsh__Hreq, Crt__Hreq, Group AB, Crt__Lreq and Rfrsh__Lreq and those requests are respectively asserted by a host control circuitry 801 and/or a graphics control circuitry 802. The memory request arbitrator 801, the host control circuitry 801 and the graphics control circuitry 802 are implemented and integrated on a single monolithic semiconductor chip. The host control circuitry 801 and the graphics control circuitry 802 share the system memory 50.

Figure 4:
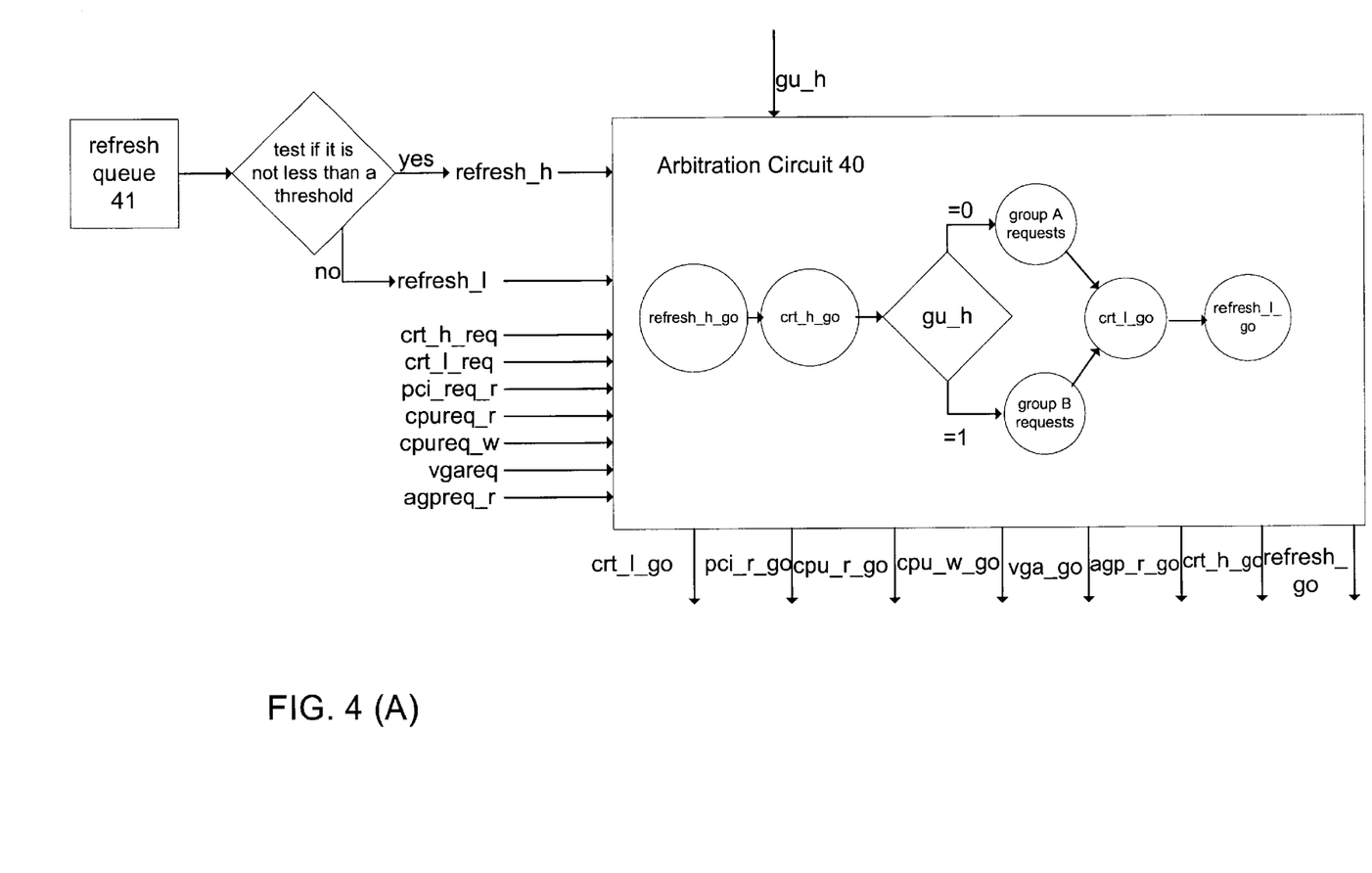
FIGS. 4(A), 4(B) and 4(C) together show the operation details within the memory request arbitrator in accordance with the present invention.

The memory request arbitrator 808 includes a refresh queue which will be described when FIG. 4(A), 4(B) and 4(C) are discussed. The graphics control circuitry 802 includes a CRT FIFO. The Rfrsh_Hreq request is a memory refresh request signal of a first type whenever the refresh queue is full. The Crt_Hreq request is a memory access signal of a first type for fueling the CRT FIFO with display data. The Group AB requests are memory access request signals of a second type output either from the graphical control circuitry 802 or the host control circuitry 801. The Crt_Lreq request is a memory access signal of a third type for fueling the CRT FIFO with display data. The Rfrsh_Lreq request is a memory refresh request signal of a second type whenever the refresh queue is non-empty. The method includes a step of prioritizing the plurality of the memory access requests in order of Rfrsh_Hreq>Crt_Hreq>Group AB>Crt_Lreq>Rfrsh_Lreq. The expression of (Rfrsh_Hreq>Crt_Hreq) indicates the priority of Rfrsh_Hreq is higher than that of Crt_Hreq. The syntax is applicable to all other expressions.

The Group AB signals include group A signals and group B signals. The group A signals include PCI_Req_r, CPU_Rd_Req and CPU_Wr_Req signals, and the group B signals include VGA_Req, AGP_Req_r signals. Group A and group B requests are placed at the same priority level.

PCI_Req_r is a signal representing a memory request from the PCI I/O bus masters. CPU_Rd_Req is a signal representing a memory read request from the host processor. CPU_Wr_Req signal is a signal representing a memory write request from the host processor.

VGA_Req includes the following signals. CR_Frm_Req and CW_Fm_Req signals respectively stand for the DRAM access requests asserted from the Read Ahead Cache reading frame buffer data from the graphical memory and from the Write Buffer retiring its stored data into the graphical memory. To post or retrieve the queue commands stored in the graphical memory, Cmd_Wr_Req and Cmd_Rd_Req signals respectively stand for the request of posting command into graphical memory and retrieving command from the graphical memory. ACL_Rd_Req and ACL_Wr_Req signals respectively stand for reading DRAM request and writing DRAM request generated by the 2D engine. TOC_Rd_Req and TOC_Wr_Req signals respectively stand for the requests of retrieving data from and of storing the operated data back to the graphical memory. TSZ_Rd_Req and TSZ_Wr_Req signals respectively stand for the requests of retrieving Z buffer data from and of storing the operated Z buffer data back to the graphical memory. Txtr_Rd_Req signal stands for the request of reading local texture data from the display memory. AGP_Req_r is a signal used to read the texture data in the memory 50 needed for a 3D rendering operation.

As shown in FIGS. 4(A), 4(B) and 4(C), the arbitrator 808 in accordance with the invention includes a refresh queue 41, a privilege timer 43, a GU grant timer 45, a grant generation circuit 49, an arbitration circuit 40 and a state machine 47. As the refresh queue 41 is full, the data of the system memory is going to lose if a memory refresh operation is not performed to the system memory. The followings describe the operation of the FIGS. 4(A), 4(B) and 4(C).

Normally, every row of the DRAM needs to be refreshed every 64 ms to maintain data integrity. Since most DRAM comprises 4096 rows, the refresh cycle can be performed once in 15.6 $\mu s$ (microsecond) or, alternatively, a burst-refresh of 4096 rows in 64 ms. This indicates that refresh request in general can tolerate longer latency as long as the 4096 refresh cycles can be performed per 64 ms. As such, the present invention sets forth a refresh queue 41 within the arbitrator 808 shown in FIG. 4(A). In a preferred embodiment, the refresh queue 41 is a 5-bit up-down counter. Each time a refresh request is produced, the refresh queue 41 increments. A threshold high, TH, watermark and a threshold low, TL, watermark are defined and tracked by the 5-bit up-down counter. In the preferred embodiment, the TH has value of 11111 (binary) which represents a full condition of the refresh queue 41, and TL has value of 00000 (binary) which represents an empty condition of the refresh queue 41. The Rfrsh_Hreq is asserted when the 5-bit up-down counter is increased up to TH and the Rfrsh_Lreq is asserted whenever the 5-bit up-down counter is not below TL and is not above TH. In other words, whenever the refresh queue 41 is not empty, i.e. not below TL, the Rfrsh_Lreq is asserted once every 15.6 $\mu s$ (microsecond). When the 5 bit up-down counter is fill, i.e. TH, the Rfrsh_Hreq is asserted. As the refresh queue 41 is full, the data of the system memory is going to lose if a refresh operation is not performed to the system memory. Therefore, Rfrsh_Hreq is treated as the highest priority. The Rfrsh_Lreq request is granted to perform the refresh cycle if no other higher priority request competes or uses the memory resource.

Since Rfrsh_Lreq can tolerate longer latency, the present invention sets forth a programmable monitoring window. It is granted only when no other higher priority request is asserted during the monitoring window which is set typically for a couple of clock.

Other than the Rfrsh_Lreq and Rfrsh_Hreq signals, CRT_Hreq, CRT_Lreq, PCI_req_r, CPU_Rd_req, CPU_Wr_req, VGA_req and AGP_req_r are also input to the arbitration circuit 40. The arbitration circuit 40 then, in accordance with the algorithm adopted by the present invention, outputs signals of REFRESH_go, CRT_h_go, PCI_r_go, CPU_r_go, CPU_w_go, VGA_go, AGP_r_go, and CRT_1_go. REFRESH_go, CRT_h_go, PCI_r_go, CPU_r_go, CPU_w_go, VGA_go, AGP_r_go, and CRT_1_go are input to the state machine 47. The state of the GU_h signal is determined by the privilege timer 43 and will be recited hereinafter in further details. The initial value of GU_h signal is set to logic high, i.e. GU_h=1. The GU_h signal is input to the multiplexer 430 for use as a select signal and also input to the arbitration circuit 40 which decides whether group A requests or group B requests has higher priority based on value of GU_h signal.

As shown in the operation of arbitration circuit 40, the request for the display data is further divided into Crt_Hreq and Crt_Lreq in the present embodiment. To ensure display motion continuous and smooth, the CRT FIFO within the graphics control circuitry 802 must at any time keep its safe display water. A Safe Display Watermark (TL) is defined to guarantee that display quality is still continuous during the period that Crt_Hgnt is not asserted in response to the assertion of the Crt_Hreq. The main reason of placing the Crt_Hreq in the second higher priority position is to ensure that the Crt_Hreq either can be serviced at the privilege of short latency and longer tenure on the memory bus. The shorter latency means that the Crt_Hreq can preempt the memory resource than any other lower priority request which currently owns the memory resource. Or the Crt_Hreq always wins the bus ownership of the memory resource if multiple memory access requests, except the Rfrsh_Hreq, are presented simultaneously. Besides, except the Rfrsh_Hreq request, no other request than the Crt_Hreq can preempt the memory resource such that Crt_Hgnt can have a longer tenure on the memory bus. As the CRT FIFO within the graphical controller 802 is drained to be less than the threshold low watermark, TL, which is tracked by an up/down counter, the Crt_Hreq is asserted. A threshold high watermark, TH, is also defined and tracked by the up/down counter. When Crt_HReq is granted to take control of the DRAM resource, the Crt_Hgnt is not negated until the CRT FIFO is filled with display data to reach the threshold high, TH.

In addition to the Crt_Hreq created, the Crt_Lreq is also created in the present invention. In the present invention, the Crt_Lreq is always asserted if the Crt_Hreq is negated. As long as there is not higher priority request competes or uses the memory resource, the Crt_Lgnt is asserted to continue fueling the display water. Memory bandwidth is thus utilized. In other words, the Crt_Lreq is asserted whenever the up-down counter is below than TH and above than TL.

As shown in FIG. 4(B), the state machine 47 operates in accordance with the predetermined equations and therefore selectively generates VGA, CRT_h, PCI, AGP_r, and CRT_l signals respectively. The VGA signal is input to the multiplexer 450 as a select signal and is input also to the grant generation circuit 49. The grant generation circuit 49 receives the current state of the state machine 47 and asserts selectively the CRT_gnt_h, PCI_gnt, VGA_gnt, AGP_gnt, and CRT_gnt_l signals.

As we recited before, group A and group B in Group AB are placed at the same priority level due to the relatively similar property of the memory access requests categorized into the group A or B. Group B comprises of the VGA_Req and AGP_Req_r while group A comprises of PCI_Req_r, CPU_Rd_Req and CPU_Wr_Req. In the following context, we use the VGA_Req as an example of group B, and the HOST_Req_represents the CPU_Rd_Req, PCI_Req and CPU_Wr_Req of group A.

In the present invention, instead of adopting any deterministic priority structure or fair rotating priority structure to arbitrate these requests, a rotating privilege priority structure is set forth with respect to group A and group B requests to meet the requirement of shorter latency of some masters yet without sacrificing the graphical performance.

Basically, VGA_Req and HOST_Req are placed at the same priority position. As recited above, a privilege timer 43 is provided within the arbitrator 808. The initial count (IC) of the privilege timer 43 can be independently and selectively loaded by the multiplexer 430 controlled by the GU_h signal. Two programmable registers, namely initial count register 433 for the group A (ICa), and initial count register 431 for the group B (ICb) are provided to selectively load the initial count of the privilege timer 43 with their values. The privilege timer 43 allows the arbitration scheme of the invention to run at a modified rotating priority algorithms, with respect to group A and group B requests, which assigns the last granted request as the lowest priority only when the privilege timer 43 expires. The following motivations invite this modified fair rotating priority algorithm of the present invention. (1) To protect each group in a higher priority such that it is not preempted during the protected period. Even though the current privileged group A relinquished the bus ownership, it can regain the bus soon by preempting the group B requests, and vice versa. Hence, higher bandwidth can be ensured during the protected period. (2) To take care of the small data transfer, multi-data transaction bus master like CPU. (3) To avoid the lower priority group from starving. As shown in FIG. 4(C), as the privilege timer 43 expires, GU_h signal is inverted. And as the privilege timer 43 does not expire, GU_h signal remains unchanged.

Initially, such as power-up event, the privilege timer 43 is allotted to group B request with the value initialized to the value set in the initial count register 431 for group B. The privilege timer 43 decrements in unit of clock whenever group B request is granted to use the DRAM resource. As long as the privilege timer 43 does not expire, group B request stays at higher priority than group A requests. Requests of group A can not preempt group B requests while group B request uses the DRAM resource. However, requests of group A may be granted to use the DRAM resource during the period group B request relinquishes the memory bus ownership. Upon the group A request's taking control of the bus, the privilege timer 43 currently allotted for group B request stops down-counting. Requests of group B can preempt group A and regains the bus ownership within a Maximum Latency which is defined as time interval from the assertion of CRT_Hreq to CRT_Hgnt. As such, before the privilege timer 43 allotted for group A request expires, group B request is positioned at a higher priority than group A request with the consequence that group B request can either own the bus for a longer, or non-interrupted period or regain the DRAM bus ownership from group A request within a short period of time. Therefore, group B request is favored with a higher bandwidth than group A request during the privileged period. Programmable privileged period set in ICa or ICb provides the flexibility to fit each resolution and application.

When the timer 43 gets expired, the GU_h value is inverted, and request of group A is positioned at a higher priority than group B. In parallel, the privilege timer 43 is allotted to the group A request with initial value re-loaded from the initial count register 433 for the group A. Similar mechanism is then used as the case when group B request is assigned as the higher priority one.

Typically, the initial count register 431 for group B requests is set much larger than the initial count register 433 for group A requests due to high bandwidth demanded by 2D and 3D operation of group B requests. Starvation for either group can be avoided since the timer 43 eventually will be expired.

As it is aforementioned, requests of group A can be granted to own the memory resource while requests of group B are idle. Under such condition, granted request of group B will be preempted by any request of group A. It has been shown that the granted VGA_Req frequently accesses the consecutive locations in the memory. In addition, preempting the granted VGA_Gnt immediately after the VGA_Gnt is asserted may give rise to the overhead paid for switching from system memory to the display memory. The display memory controller 802 may only perform not many or very fewer data transaction during the limited period.

Without an additional provision of a GU grant timer of the invention, during the period that group A request is placed at a higher priority than group B request, grant of the requests of group B is preempted by requests of group A immediately after the request of group A is asserted. However, the present invention sets forth a GU grant-timer 45 to avoid the VGA_Gnt from being preempted by the requests of group A right after the requests of group A is asserted during the period that group A request is placed at a higher priority than group B request.

As shown in FIG. 4(B), as the state machine 47 is in a VGA state during a GU cycle, the state machine 47 outputs a VGA signal to the multiplexer 450. In response, the multiplexer 450 inputs an initial value within the programmable register 453 into the VGA grant timer 45 and the timer 45 starts to down-count. If there is any other requests in Group AB is asserted, the present invention tests if the timer 45 expires. If it does not expire, VGA_gnt always takes control of the memory bus. If it expires, the invention tests if the asserted request is a group B request. If this test shows that the newly asserted request is a group B request, VGA_gnt stills takes control of the memory bus. If this test shows that the newly asserted request is not a group B request, VGA_gnt is then de-asserted and the memory bus is preempted by the newly asserted request. However, it is noted that, with the provision of the GU grant timer 45, priority for requests of Rfrsh_Hreq and Crt_Hreq are still higher than group B requests.

In other words, whenever the VGA_Gnt is asserted, the GU grant timer 45 is loaded with the initial value and starts to down-count. Before the grant timer 45 gets expired, the VGA_Gnt is not allowed to be preempted by the requests from group A even when group A is assigned at higher priority than group B. This mechanism temporarily collapses the rotating priority structure of group A and B by granting the VGA_Req to a reasonable longer tenure such that the switching overhead incurred from accessing the system memory to the display memory is paid worthily. Furthermore, in order not to make detriment to the objective of the privilege timer 43, it is preferred that the initial count of the GU grant timer 45 is set to a value smaller than the initial count register 433 for group A requests.

Thus, the method of arbitrating these memory access requests in a UMA via a Non-UMA controller of present invention achieves smoothing the display quality, ensuring continuous motion, maintaining shorter latency to the requests of low latency requirement, and thus maximizing the bus performance.

In summary, a threshold low TL watermark of the CRT FIFO in the graphical control circuitry 802 is defined, and the Crt_Hreq signal is asserted as the threshold low TL watermark is reached to prevent the display from becoming discontinuous. The Crt_Lreq signal is asserted if the Crt_Hreq is negated.

A threshold high TH and low TL watermarks of the CRT FIFO are defined. The graphical controller circuitry 802 further comprises an up-down counter to track the watermarks of the CRT FIFO. The Crt_Hreq is negated as the CRT FIFO is fueled up to TH and the Crt_Lreq is asserted when the watermark drops from TH to TL.

The refresh queue 41 is a 5-bit up-down counter increments every 15.6 μs (microsecond) and decrements whenever either the Rfrsh_Lreq or Rfrsh_Hreq signal is granted to access the system memory. The Rfrsh_Lreq is asserted whenever the 5-bit up-down counter 41 is not below TL and is not above TH, and the Rfrsh_Hreq is asserted when the 5-bit up-down counter 41 is increased up to TH.

The memory request arbitrator 808 includes a privilege timer 43 that operates a rotating priority algorithm over the memory access requests of group A and group B. The rotating priority algorithm assigns a last granted memory request to a lowest priority only when the privilege timer 43 expires and the request in group A is selectively assigned at a higher priority than request in group B for a duration which is defined by two programmable registers ICa and ICb corresponding to the group A and group B respectively.

The privilege rotates from requests of group A to group B when the privilege timer 43 having duration defined by ICa expires, and the privilege timer 43 then is allotted to requests of group B and initialized with the value of ICb.

The privilege rotates from group B to group A when the privilege timer 43 having duration defined by ICb expires, and the privilege timer 43 then is allotted to request of group A and initialized with the value of ICa.

The memory request arbitrator 808 comprises a GU grant-timer 45 which prevents preemption of the system memory by other requests of group a during a GU cycle.

What is claimed is:

1. A method for granting a system memory by a memory request arbitrator to a request among a plurality of pending memory access requests, the plurality of the memory access requests comprising Rfrsh_Hreq, Crt_Hreq, Group AB, Crt_Lreq and Rfrsh_Lreq and being respectively asserted by a host control circuitry and/or a graphics control circuitry, the host control circuitry, the graphics control circuitry and the memory request arbitrator being implemented and integrated on a single monolithic semiconductor chip, the host control circuitry and the graphics control circuitry sharing the system memory, the memory request arbitrator comprising a refresh queue and the graphics control circuitry comprising a CRT FIFO, wherein the Rfrsh_Hreq is memory refresh request signal of a first type whenever the refresh queue being full, the Crt_Hreq is memory access signal of a first type for fueling the CRT FIFO with display data, the Group AB are memory access signals of a second type output either from the graphical control circuitry or the host control circuitry, the Crt_Lreq is memory access signal of a third type for fueling the CRT FIFO with display data, the Rfrsh_Lreq is memory refresh request signal of a second type whenever the refresh queue being non-empty, the method comprising the step of:

prioritizing the plurality of the memory access requests in order of

Rfrsh_Hreq>Crt_Hreq>Group AB>Crt_Lreq>Rfrsh_Lreq.

2. The method of claim 1, wherein the Group AB signals include group A signals and group B signals, the group A signals include PCI_Req_r, CPU_Rd_Req and CPU_Wr_Req signals, the group B signals include VGA_Req, AGP_Req_r signals.

3. The method of claim 1, as the refresh queue is full, the data of the system memory is going to be lost if memory refresh operation is not performed to the system memory.

4. The method of claim 1, wherein a threshold low TL watermark of the CRT FIFO is defined, and the Crt_Hreq signal is asserted as the threshold low TL watermark is reached to prevent the display from becoming discontinuous.

5. The method of claim 1, the Crt_Lreq is asserted when the Crt_Hreq is negated.

6. The method of claim 1, wherein the refresh queue is a 5-bit up-down counter incrementing every 15.6 μs (micro second) and decrementing whenever either the Rfrsh_Lreq or Rfrsh_Hreq is granted to access the system memory, a threshold high TH and a threshold low TL watermarks are defined and tracked by the 5-bit up-down counter, the Rfrsh_Hreq is asserted when the 5-bit up-down counter is increased up to TH, the Rfrsh_Lreq is asserted whenever the 5-bit up-down counter is not below TL and is not above TH.

7. The method of claim 4, a threshold high TH watermark is defined, wherein the graphical controller circuitry further comprises an up-down counter to track the watermarks of the CRT FIFO, the Crt_Hreq is negated as the CRT FIFO is fueled up to TH, the Crt_Lreq is asserted when the up-down counter decreases from TH to TL.

8. The method of claim 2, the memory request arbitrator comprises a privilege timer that operates a rotating priority algorithm over the memory access requests of group A and group B, the rotating priority algorithm assigns a last granted memory request to a lowest priority only when the privilege timer expires, the request in group A is selectively assigned at a higher priority than request in group B for a duration which is defined by two programmable registers ICa and ICb corresponding to the group A and group B respectively.

9. The method of claim 8, privilege rotates from group A to group B when the privilege timer having duration defined by ICa expires, and the privilege timer then is allotted to requests of group B and initialized with the value of ICb.

10. The method of claim 8, privilege rotates from group B to group A when the privilege timer having duration defined by ICb expires, and the privilege timer then is allotted to requests of group A and initialized with the value of ICa.

11. The method of claim 2, the memory request arbitrator comprises a GU grant-timer which prevents preemption of the system memory by requests indicated by the group A signals during a GU cycle.

12. The method of claim 6, wherein the TH is 11111 (binary) and TL is 00000 binary).

13. A monolithic semiconductor memory control apparatus for controlling a memory device external to the monolithic semiconductor memory control apparatus, comprising:
  a host bus interface device integrated on a single monolithic semiconductor chip;
  a host-graphics bridge device integrated on said single monolithic semiconductor chip;
  a core logic memory controller coupled to the host bus interface device via a first address bus and a first data bus, the core logic memory controller being integrated on said single monolithic semiconductor chip;
  a display memory controller coupled to the host-graphics bridge device via a second address bus and a second data bus, the display memory controller being integrated on a single monolithic semiconductor chip;
  an arbitrator, coupled to the core logic memory controller and the display memory controller respectively, for granting the memory device to a request an plurality of pending memory access requests, the plurality of the memory access requests comprising Rfrsh_Hreq, Crt_Hreq, Group AB, Crt_Lreq and Rfrsh_Lreq and being respectively asserted by the host bus interface device and/or the host-graphics bridge device, the arbitrator comprising a refresh queue and the host-graphics bridge device comprising a CRT FIFO, the arbitrator being integrated on said single monolithic semiconductor chip, wherein the Rfrsh_Hreq is memory refresh request signal of a first type whenever the refresh queue being full, the Crt_Hreq is memory access signal of a first type for fueling the CRT FIFO with display data, the Group AB are memory access signals of a second type output either from the host-graphics bridge device or the host bus interface device, the Crt_Lreq is memory access signal of a third type for fueling the CRT FIFO with display data, the Rfrsh_Lreq is memory refresh request signal of a second type whenever the refresh queue being non-empty, the arbitrator prioritizing the plurality of the memory access requests in order of Rfrsh_Hreq>Crt_Hreq>Group AB>Crt_Lreq>Rfrsh_Lreq.

14. The apparatus of claim 13, wherein the Group AB signals include group A signals and group B signals, the group A signals include PCI_Req_r, CPU_Rd_Req and CPU_Wr_Req signals, the group B signals include VGA_Req, AGP Req_r signals.

15. The apparatus of claim 13, as the refresh queue is full, the data of the memory device is going to be lost if memory refresh operation is not performed to the memory device.

16. The apparatus of claim 13, wherein a threshold low TL watermark of the CRT FIFO is defined, and the Crt_Hreq signal is asserted as the threshold low TL watermark is reached to prevent the display from becoming discontinuous.

17. The apparatus of claim 13, the Crt_Lreq is asserted when the Crt_Hreq is negated.

18. The apparatus of claim 13, wherein the refresh queue is a 5-bit up-down counter incrementing every 15.6 $\mu$s (micro second) and decrementing whenever either the Rfrsh_Lreq or Rfrsh_Hreq is granted to access the memory device, a threshold high TH and a threshold low TL watermarks are defined and tracked by the 5-bit up-down counter, the Rfrsh_Hreq is asserted when the 5-bit up-down counter is increased up to TH, the Rfrsh_Lreq is asserted whenever the 5-bit up-down counter is not below TL and is not above TH.

19. The apparatus of claim 16, a threshold high TH watermark is defined, wherein the host-graphics bridge device further comprises an up-down counter to track the watermarks of the CRT FIFO, the Crt_Hreq is negated as the CRT FIFO is fueled up to TH, the Crt_req is asserted when the up-down counter decreases from TH to TL.

20. The apparatus of claim 14, the arbitrator comprises a privilege timer that operates a rotating priority algorithm over the memory access requests of group A and group B, the rotating priority algorithm assigns a last granted memory request to a lowest priority only when the privilege timer expires, the request in group A is selectively assigned at a higher priority than request in group B for a duration which is defined by two programmable registers ICa and ICb corresponding to the group A and group B respectively.

21. The apparatus of claim 20, privilege rotates from group A to group B when the privilege timer having duration defined by ICa expires, and the privilege timer then is allotted to requests of group B and initialized with the value of ICb.

22. The apparatus of claim 20, privilege rotates from group B to group A when the privilege timer having duration defined by ICb expires, and the privilege timer then is allotted to requests of group A and initialized with the value of ICa.

23. The apparatus of claim 14, the arbitrator comprises a GU grant-timer that prevents preemption of the memory device by requests indicated by the group A signals during a GU cycle.

24. A monolithic semiconductor memory control apparatus for controlling a memory device external to the monolithic semiconductor memory control apparatus, comprising:
  a host bus interface device integrated on a single monolithic semiconductor chip;
  a host-graphics bridge device integrated on said single monolithic semiconductor chip;
  memory control means, coupled to the host bus interface device via a first address bus and a first data bus and coupled to the host-graphics bridge device via a second address bus and a second data bus, the memory control means being integrated on said single monolithic semiconductor chip;
  an arbitrator, coupled to the memory control means, for granting the memory device to a request among a plurality of pending memory access requests, the plurality of the memory access requests comprising Rfrsh_Hreq, Crt_Hreq, Group AB, Crt_Lreq and Rfrsh_Lreq and being respectively asserted by the host bus interface device and/or the host-graphics bridge device, the arbitrator comprising a refresh queue and the host-graphics bridge device comprising a CRT FIFO, the arbitrator being integrated on the single monolithic semiconductor chip, wherein the Rfrsh_Hreq is memory refresh request signal of a first type whenever the refresh queue being full, the Crt_Hreq is memory access signal of a first type for fueling the CRT FIFO with display data, the Group AB are memory access signals of a second type output either from the host-graphics bridge device or the host bus interface device, the Crt_Lreq is memory access signal of a third type for fueling the CRT FIFO with display data, the Rfrsh_Lreq is memory refresh request signal of a second type whenever the refresh queue being non-empty, the arbitrator prioritizing the plurality of the memory access requests in order of Rfrsh_Hreq>Crt Hreq>Group AB>Crt_req>Rfrsh_Lreq.

* * * * *